May 10, 1932.  A. PAHL ET AL  1,857,565

SURFACE CARBURETOR

Filed June 24, 1929

Inventors
August Pahl and Heinrich Heimann
By B. Singer,
Atty.

Patented May 10, 1932

1,857,565

UNITED STATES PATENT OFFICE

AUGUST PAHL AND HEINRICH HEIMANN, OF BERLIN, GERMANY

SURFACE CARBURETOR

Application filed June 24, 1929, Serial No. 373,306, and in Germany December 16, 1927.

This invention relates to carburetors of the so-called surface type, and of the class wherein the carbureting surface for the fuel, such for instance as benzine, heavy oils or the like, consists of a porous filling body or substance to which the fuel is fed.

Porous bodies of clay or porcelain for the fine division of liquid fuel in air is not practicable under the usual working conditions as heretofore proposed, because the porosity of such bodies of porous clay or porcelain is far from being sufficient even if these bodies are made of the coarsest possible porous substances. However coarse the pores may be the partial vacuum created by the suction of the combustion engine is not sufficient to aspire an adequate quantity of fuel through the pores of the said body per unit of time.

For instance in the case of an engine of approximately 40 H. P. (average output) it is a question of obtaining a quantity of fluid of about 16 to 20 litres per hour. This quantity of liquid fuel has to pass through the pores of the porous body, or in other words a quantity of approximately five cubic centimetres must pass through the body per second. It must be further borne in mind that the cross section of free passage through the carburetor pipe, if the required velocity of suction is to be attained, must not exceed a definite and defined limit. In consequence of this the dimensions of the porous body or substance absorbing the liquid fuel, which can be inserted into the carburetor are very closely limited.

The proposal moreover to use instead of rigid units or bodies of clay or porcelain loose filling substances having porous properties does not lead to a practical or feasible method of designing a surface carburetor able to deliver sufficient liquid fuel when acted upon by the partial vacuum or suction of the engine. These loose filling bodies cannot in themselves fulfil the requirements of practical motor car running. In the case of a surface carburetor which can be used in practical working the carbureting filling body must be a single unit sufficiently strong for mechanical requirements and interchangeable.

It has been ascertained by the present applicants that it is possible to produce elements or bodies for insertion into a surface carburetor which have sufficient properties of capillary suction to deal with the quantity of fuel supplied and having at the same time sufficient cross section for the passage of the considerable quantity of fuel used for the driving of motors for vehicles or internal combustion engines.

For the purpose of carrying out the present invention bodies or substances are employed consisting of suitable fine or coarse granular material, especially glass or glass like material, but metallic oxides and even metals can be used which can be rendered porous by a sintering process.

According to one method fine or coarse granular powdered glass may be acted upon in a mould and pressed and agglommerated whilst being heated to the temperature of sintering.

The degree of porosity of bodies thus produced depends solely upon the size of the granules of the preliminary material used. The uniformity of the pores depends upon the uniformity of the size of the granules. The rigidity and strength of bodies thus sintered together is, in consequence of the intimate cohesion of the individual granules when sintered together, very great; so that this strength is adequate for all requirements, as for instance those of a kind met with during the running of motor vehicles.

It has been ascertained by means of experiments, that bodies formed from glass thus sintered together, where the size of the glass granules is approximately 0.5 mm., instantly suck up liquids of all kinds such for instance as water, benzine or the like to a very high degree, by reason of their capillary action, and simultaneously, by reason of the size of the porous interstices between the granules, are able to give off to an aspired current of air quickly sufficient quantities of the said fluids or liquids. According to the size chosen for the granules of the glass powder employed, it is possible to vary the quantity of the liquid per second passed through the sintered glass body by the suction or partial vacuum of the air current. This quantity may vary within wide limits so that glass bodies thus produced are eminently suitable for insertion into fuel carburetors and may be used to good effect in place of spray carburetors, especially as the area of the carburetting surface which comes in question can be regulated in a simple manner by a suitable covering for the said surface by means of a slide or the like.

A carburetor of the foregoing description is shown according to two constructional embodiments in the accompanying drawings.

Figure 1:
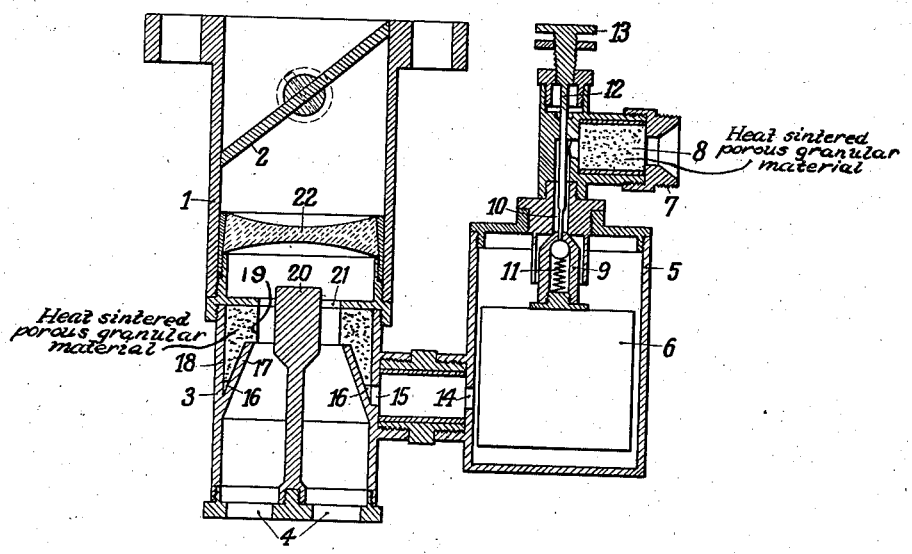
Fig. 1 is a vertical section of one constructional form of the carburetor.

Referring to Fig. 1, 1 denotes the usual well known carburetor discharge pipe provided with a throttle or flap valve 2. The axially contiguous air inlet pipe 3 is supplied with air by means of the centrally arranged orifices or apertures 4. The fuel which must be evenly and homegeneously mixed and diffused in the air for the production of a fuel mixture is supplied from the float chamber 5 which is furnished with a float 6 for regulating the level of the liquid.

The fuel is conducted to the float chamber 5 from above through a junction 7, and is compelled to pass through a filter 8, which is preferably formed of a coarsely sintered substance such as glass or glassy body or the like.

The float is provided in a well known manner with a cut-off valve 9 which closes the outlet orifice 10 of the fuel supply when a certain level is reached by the liquid. The adjustment of the float in such a manner that it cuts off the fuel supply orifice when a predetermined level of the liquid is reached may for instance be effected by a spring 11 which has previously been tensioned to the required degree, and the tension of the spring 11 may be adjusted by means of the spindle 12 provided with a knob 13 for manipulating it.

The liquid flows from the orifice 14 in the float chamber through an orifice 15 in the carburetor pipe 3 and to an annular chamber 16 which is bounded by the outer wall of the pipe 3 and by an intermediate wall 17 which is tapered inwards in the form of a nozzle. The conical annular space between the partition 17 and the outer wall 3, the lower portion of which forms the ring shaped chamber 16 serves for the reception of the actual surface carburetor body 18, which has been sintered together in a suitable shape from granular material, for instance glass under heat. The inner ring shaped surface 19 of this porous sintered body forms the extension of the nozzle 17. By this means the air drawn in by the engine is compelled to sweep uniformly along this annular surface and draws or sucks the fuel from the porous body. By reason of the large extent of the annular surface and owing to the homogeneous formation of the pores of the sintered body in this way an even mixing of the fuel in the air is obtained in an extraordinarily fine state of sub-division and even a partial gasification. The distribution or sub-division of the fuel in the air or its gasification is so perfect that no appreciable precipitations of fuel occur on the walls of the carburetor pipe right up to the working cylinder, and therefore separation of the constituents of the mixture cannot take place, as is the case with ordinary carburetors especially when working with heavy oils, which leads to irregularity or stoppage in working and to low efficiency.

For the purpose of rendering the flow of the air along the ring shaped surface 19 of the porous body 18 as even or regular as possible, a special centrally inserted body 20, for instance of metal may be provided, so that a ring shaped opening 21 is formed for the passage of the air drawn in by the annular surfaces of the porous body and the inserted member 20.

The fuel and air mixture is then conducted through the carburetor pipe 1 to the engine, being however passed through an intermediate filter 22 made from specially coarse sintered material for the purpose of more perfect mixing.

Figure 2:
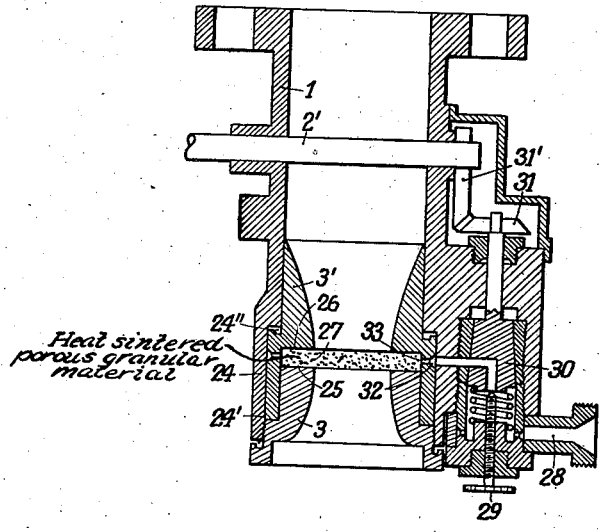
Fig. 2 shows, also in vertical section, a second constructional form illustrating a floatless carburetor.

In the constructional form according to Fig. 2, 1 is the carburetor pipe which is provided with a spindle 2', for the throttle or flap valve—not shown. At the lower end of the carburetor pipe 1 is located the air inlet pipe socket, shaped like a diffuser and sub-divided into two parts 3, 3'. The upper part of the air inlet socket 3' encloses the lower part 3 by means of a cylindrical extension 24. The lower frontal face 24' of the cylindrical extension 24 fits against a shoulder of the part 3, and the upper frontal face 24" of the cylindrical extension fits against a shoulder provided on the carburetor pipe 1, and a packing ring may for instance be inserted between the shoulder on the carburetor pipe 1 and the upper frontal face 24".

Between the upper frontal face 25 of the part 3 of the air inlet pipe socket and the other frontal face 26 of the part 3' thereof is inserted the body 27 of porous sintered material which is formed as a ring. The supply of the fuel to this inserted body 27 is effected through the fuel supply socket 28 through a throttle or flap valve 29, which is adjustable by hand and through a coned plug of a cock 30, which is operated or controlled by means of a bevel gear 31, 31' from the throttle valve spindle 2'. The fuel then flows to an annular channel 32 which is in communication with the inserted porous member by means of holes 33.

What we claim and desire to secure by Letters Patent of the United States of America is:—

1. A surface carburetor, particularly for combustion engines, having a porous body comprising a mass of heat sintered granular material inserted for the reception and transmission of fuel to the air, said porous inserted body consisting of heat cintered porous granular quartz.

2. A carburetor having a duct through which mixture is discharged, said duct having a porous body therein for the reception and transmission of fuel to the air, said porous body consisting of heat sintered porous granular material and the inner surface thereof being exposed.

In witness whereof we affix our signatures.

AUGUST PAHL.
HEINRICH HEIMANN.